United States Patent [19]
Brief

[11] Patent Number: 6,070,208
[45] Date of Patent: *May 30, 2000

[54] APPARATUS AND METHOD FOR IMPLEMENTING A VERSATILE USB ENDPOINT PIPE

[75] Inventor: David Brief, Ra'anana, Israel

[73] Assignee: National Semiconductor Corporation, Santa Clara, Calif.

[*] Notice: This patent is subject to a terminal disclaimer.

[21] Appl. No.: 09/003,963

[22] Filed: Jan. 7, 1998

[51] Int. Cl.[7] ........................................... G06F 9/445
[52] U.S. Cl. .............................. 710/104; 710/10; 713/100
[58] Field of Search .................................. 710/104, 8, 10, 710/12, 14, 19, 22; 713/100

[56] References Cited

U.S. PATENT DOCUMENTS

| | | | |
|---|---|---|---|
| 5,729,721 | 3/1998 | Bettelheim et al. | 395/557 |
| 5,751,951 | 5/1998 | Osborne et al. | 395/200.8 |
| 5,778,218 | 7/1998 | Gulick | 710/60 |
| 5,835,791 | 11/1998 | Goff et al. | 710/62 |
| 5,841,471 | 11/1998 | Endsley et al. | 348/231 |
| 5,848,293 | 12/1998 | Gentry | 710/5 |
| 5,875,351 | 2/1999 | Riley | 395/842 |
| 5,901,332 | 5/1999 | Gephardt et al. | 710/41 |

OTHER PUBLICATIONS

U.S. application No. 09/003,897, filed Jan. 7, 1998.
U.S. application No. 09/004,004, filed Jan. 7, 1998.
U.S. application No. 09/004,003, filed Jan. 7, 1998.
U.S. application No. 09/004,002, filed Jan. 7, 1998.
U.S. application No. 09/004,005, filed Jan. 7, 1998.
U.S. application No. 09/003,925, filed Jan. 7, 1998.
USB Feature Specification: Shared Endpoints; SystemSoft Corporation, Intel Corporation; pp. i–iii, 1–14; Dec. 4, 1997.
Universal Serial Bus Common Class Specification; SystemSoft Corporation, Intel Corporation; pp. i–v, 1–14; Nov. 4, 1997.
Universal Seril Bus Specification; Compaq, Digital Equipment Corporation, IBM PC Company, Intel, Microsoft, NEC, Northern Telecom; pp. 1–268; Jan. 15, 1996.
8x930Ax, 8x930Hx Users Manual; Intel; pp. 6.1–10.1 Appendix B–D; 1997;.

*Primary Examiner*—Paul R. Myers
*Attorney, Agent, or Firm*—Limbach & Limbach, LLP

[57] ABSTRACT

An apparatus for and method of controlling a versatile USB endpoint pipe are disclosed. The USB endpoint pipe can be in various states which are determined by control commands. The control commands also determine the endpoint pipe type.

36 Claims, 3 Drawing Sheets

FIG. 1b  FIG. 1c

APPARATUS AND METHOD FOR IMPLEMENTING A VERSATILE USB ENDPOINT PIPE

BACKGROUND OF THE INVENTION

1. Field of the Invention

The present invention relates to the Universal Serial Bus (USB) protocol. In particular, the invention relates to the control of versatile USB endpoints.

2. Description of the Related Art

Universal Serial Bus (USB) is a standard peripheral interface for attaching personal computers to a wide variety of devices: e.g., digital telephone lines, monitors, modems, mice, printers, scanners, game controllers, keyboards, and other peripherals. The USB thus replaces existing interfaces such as the RS-232C serial ports, parallel ports, PS/2 interfaces, and game/MIDI ports.

In accordance with USB, all attached devices connect to a personal computer through a single connector type using a tiered-star topology. A host personal computer includes a single USB controller. The host controller provides the interface between the USB network and the host personal computer. The host controller controls all accesses to USB resources and monitors the bus's topology. A USB hub provides USB attachment points for USB devices.

A USB function is a USB device that is able to transmit and receive information on the bus. A function may have one, or more, configurations, each of which defines the interfaces that make up the device. Each interface, in turn, is made up of one of more endpoints.

An endpoint is the ultimate source, or sink, of data. An endpoint pipe provides for the movement of data between USB and memory, and completes the path between the USB host and the function endpoint.

Each endpoint is an addressable entity on USB and is required to respond to IN and OUT tokens from the USB host (typically a PC). The IN tokens indicate that the host has requested to receive information from an endpoint, and OUT tokens indicate that the host is about to send information to an endpoint.

On detection of an IN token addressed to an endpoint, the endpoint is responsible for responding with a data packet. If the endpoint is currently stalled, a STALL handshake packet is sent. If the endpoint is enabled, but no data is present, a negative acknowledgment (NAK) handshake packet is sent.

Similarly, on detection of an OUT token addressed to an endpoint, the endpoint is responsible for receiving a data packet sent by the host and storing it in a buffer. If the endpoint pipe is currently stalled, at the end of the data transmission, a STALL handshake packet is sent. If the endpoint pipe is currently disabled, at the end of the data transmission, no handshake packet is sent. If the endpoint pipe is enabled, but no buffer is present in which to store the data, a NAK handshake packet is sent.

A disabled endpoint, or endpoints not currently mapped to an endpoint pipe do not respond to IN, OUT, or SETUP tokens.

A number of vendors have developed implementations of the USB standard. For example, Intel Corp. has released the 8x931Ax, 8x931Hx, 8x930Ax, and 8x930Hx devices.

However, these devices have a number of limitations. For example, the 8x931Ax is limited to three endpoint pairs of a transmit endpoint and a receive endpoint, each with predefined and dedicated data storage (dedicated FIFOs). The other Intel devices have similar limitations. Furthermore, each endpoint pair can operate under only a subset of the available USB transmission types. There is a need for a device having a greater number of endpoints whose types and data storage can be defined as necessary.

In addition, the 8x931Ax uses a large number of registers to store control information. There is a need for a device having fewer registers to reduce the cost per endpoint.

SUMMARY OF THE INVENTION

The present invention addresses these and other problems by providing an apparatus for and method of controlling a versatile USB endpoint pipe having an endpoint pipe state and an endpoint pipe type.

According to one embodiment, an apparatus according to the present invention includes a first memory, a second memory, and control circuitry. The first memory stores the endpoint pipe state, and the second memory stores an endpoint command. The control circuitry changes the endpoint state from a wait state to an idle state when the endpoint command is an enable command. The endpoint pipe state is undetermined in the wait state, and the enable command determines the endpoint pipe type.

According to another embodiment, the control circuitry further changes the endpoint state to a ready state when the endpoint command is a ready command. The ready command further determines the endpoint pipe type.

According to yet another embodiment, a method according to the present invention includes the steps of maintaining the endpoint pipe state in a wait state, and changing the endpoint pipe state from the wait state to an idle state in response to an enable command. The endpoint pipe state is undetermined in the wait state, and the enable command determines the endpoint pipe type.

According to still another embodiment, the method further includes the step of changing the endpoint pipe state from the idle state to a ready state in response to a ready command. The ready command further determines the endpoint pipe type.

A better understanding of the features and advantages of the present invention will be obtained by reference to the following detailed description and accompanying drawings which set forth illustrative embodiments in which the principles of the invention are utilized.

BRIEF DESCRIPTION OF THE DRAWINGS

FIG. 1b is a state diagram corresponding to the block diagram of FIG. 1a.

FIG. 1c is a state diagram showing a further embodiment corresponding to the block diagram of FIG. 1a.

FIG. 2b is a state diagram corresponding to the block diagram of FIG. 2a.

FIG. 3b is a state diagram corresponding to the block diagram of FIG. 3a.

DETAILED DESCRIPTION OF THE PREFERRED EMBODIMENTS

The invention described in this application is an aspect of a larger set of inventions described in the following co-pending applications which are commonly owned by the assignee of the present invention, and are hereby incorporated by reference:

U.S. patent application Ser. Nos. 09/003,897, 09/004,004, 09/004,003, 09/004,002, 09/004,005, and 09/003,925.

General Description of the Invention

Figure 1A:
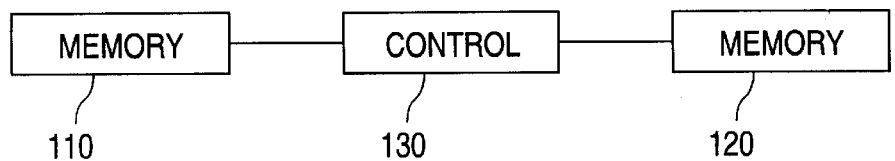
FIG. 1a is a block diagram of one aspect of the present invention.

FIGS. 1a–1b illustrate a general embodiment of one aspect of the present invention for an endpoint pipe. FIG. 1a shows a first memory 110, a second memory 120, and control circuitry 130. Memory 110 stores a state of the endpoint pipe and memory 120 stores an endpoint command. The endpoint pipe has a type which can be undetermined.

FIG. 1b shows a wait state 150 and an idle state 160.

The invention of FIGS. 1a–1b operates as follows. Initially, the endpoint type is undefined and memory 110 indicates that the endpoint is in wait state 150. The endpoint command stored in memory 120 is changed to an enable command CMD.ENB by firmware. Control circuitry 130 changes the state from wait state 150 to idle state 160. Finally, based on a subset of the enable command, control circuitry 130 determines the endpoint pipe type.

FIG. 1c shows a further embodiment of the invention shown in FIGS. 1a–1b. The endpoint command stored in memory 120 is changed to a ready command CMD.RDY by firmware. Control circuitry 130 changes the state from idle state 160 to a ready state 170. Based on a subset of the enable command, control circuitry 130 further determines the endpoint pipe type.

Figure 2A:
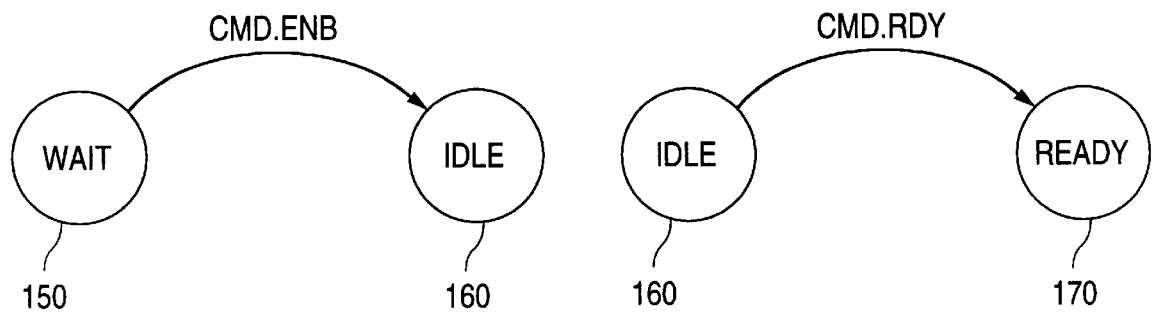
FIG. 2a is a block diagram of another aspect of the present invention.
Figure 2A:
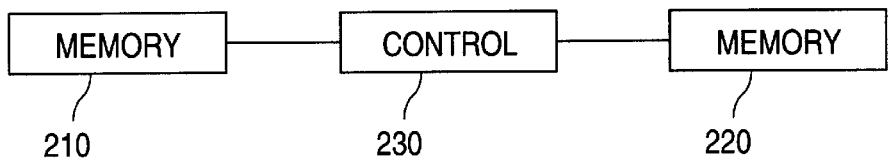
Figure 2B:
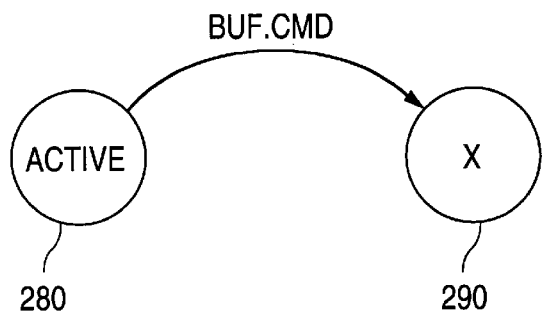

FIGS. 2a–2b illustrate a general embodiment of another aspect of the present invention for an endpoint pipe. FIG. 2a shows a first memory 210, a second memory 220, and control circuitry 230. Memory 210 stores a state of the endpoint pipe and memory 220 stores a buffer command.

FIG. 2b shows an active state 280 and a different state 290.

The invention of FIGS. 2a–2b operates as follows. Initially, memory 210 indicates that the endpoint is in active state 280. The buffer command stored in memory 220 is changed to a buffer command BUF.CMD. Control circuitry 230 changes the state from active state 280 to different state 290.

This aspect allows state transition commands to be read from a memory.

Figure 3A:
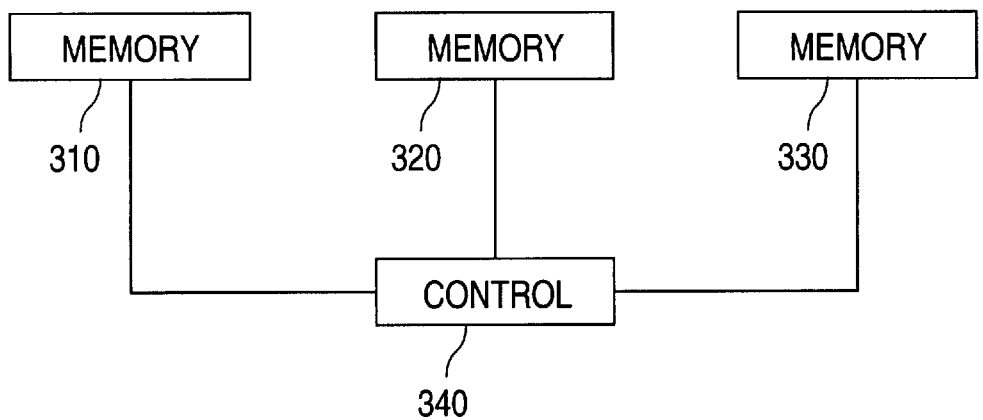
FIG. 3a is a block diagram of yet another aspect of the present invention.
Figure 3B:
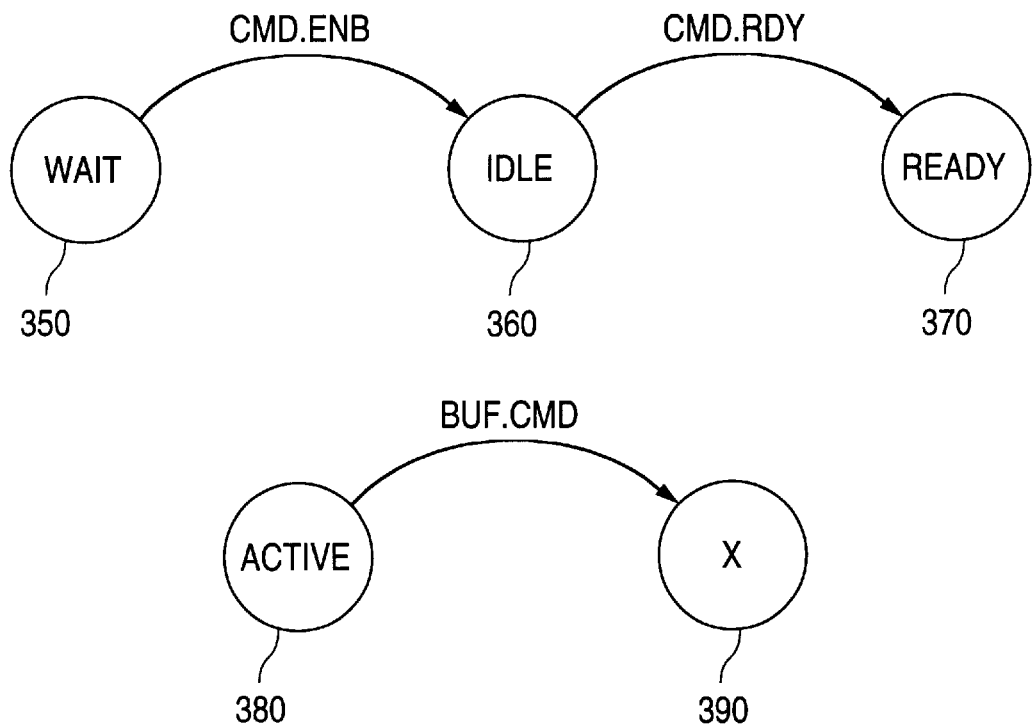

FIGS. 3a–3b illustrate a general embodiment of a combination of the invention of FIGS. 1a–1c and 2a–2b for an endpoint pipe. FIG. 3a shows a first memory 310, a second memory 320, a third memory 330, and control circuitry 340. Memory 310 stores a state of the endpoint pipe, memory 320 stores an endpoint command, and memory 330 stores a buffer command. The endpoint pipe has a type which can be undetermined.

FIG. 3b shows a wait state 350, an idle state 360, a ready state 370, an active state 380, and a different state 390.

The invention of FIGS. 3a–3b operates as follows. Initially, the endpoint type is undefined and memory 310 indicates that the endpoint is in wait state 350. The endpoint command stored in memory 320 is changed to an enable command CMD.ENB by firmware. Control circuitry 340 changes the state from wait state 350 to idle state 360. Based on a subset of the enable command, control circuitry 130 determines the endpoint pipe type.

Next, the endpoint command stored in memory 320 is changed to a ready command CMD.RDY by firmware.

Control circuitry 340 changes the state from idle state 360 to ready state 370. Based on a subset of the enable command, control circuitry 130 further determines the endpoint pipe type.

At another point in the operation of the endpoint pipe, memory 310 indicates that the endpoint is in active state 380. The buffer command stored in memory 330 is changed to a buffer command BUF.CMD. Control circuitry 340 changes the state from active state 380 to different state 390.

Although this specification uses the term "memory", the invention is also intended to apply to other types of data storage elements.

This general description is further detailed in the following section, which illustrates preferred embodiments of the aspects of the present invention.

Preferred Embodiments of the Invention

In a preferred embodiment, the invention described above is implemented as parts of a USB node interface module (UNIM). Parts of the UNIM relevant to the invention of the present application include an endpoint controller, an endpoint pipe controller, various registers, a control word, and a state diagram.

Endpoint Controller

In a preferred embodiment, the endpoint controller handles the endpoint related operations including endpoint pipe state, buffering and transfers. In a preferred embodiment, up to 16 endpoint pipes can be supported at any given time. Each endpoint pipe can be allocated up to two buffers, in the core-bus address space, that are used for receive and transmit operations. If no buffers are allocated to an endpoint pipe, the controller is responsible for providing appropriate handshakes for input tokens and output tokens.

The endpoint controller includes several functional blocks. The endpoint state machine provides the centralized control for the utility blocks of the data alignment multiplexer (DALM), the address generator (ADGen), and the partial endpoint pipe (PEP) storage. Device functions such as address checking and generation are accomplished in the device function block. In a preferred embodiment, all the state machines run on a 12 MHz USB clock. All data transfers work on a core bus clock. Parts of the ADGen block, and all the DALM block, operate using the core bus clock. All other blocks of the endpoint controller use the local 12 MHz clock exclusively. Data bytes between the domains are synchronized at the MAC user interface with an asynchronous handshake for each transferred byte.

In a preferred embodiment, the endpoint controller minimizes the number of memory accesses required. Only on reception of a token is a memory access required to the endpoint array. A single double-word access, together with the resident endpoint state, is sufficient to allow the endpoint pipe to process the host request. This access reads the location and size information for the data transfer. The data transfer occurs in successive double-word read or write operations. The module has the highest priority on the core bus for transfers, and the transfer rate is considerably higher than that of USB. Thus, there is a minimal requirement for data buffering within the endpoint controller, aside from an extra word to overlap subsequent accesses with the current one.

A byte counter keeps track of the number of bytes that are transferred. The last access of a transfer may require a partial read or write of memory. The partial write of the last access is determined by the final byte count.

At the end of a transfer, the current control word is written with status for the transfer, and the other control word for this endpoint is read to check to see if another buffer was prepared. After the control word operations, the endpoint pipe state is updated.

Through a combination of hardware and software, the UNIM supports all three USB defined synchronization classes, Asynchronous, Synchronous and Adaptive. The endpoint controller provides hardware assistance for monitoring the USB 1 KHz bus clock relative to an external reference such as an 8 KHz reference, and for monitoring the quality and consistency of the USB 1 KHz bus clock. Rising edges of an external reference clock are counted in the reference count register. This can be used to compare to the USB frame number. The difference in frequency between the reference clock and the USB clock can be signaled in packets to the host, such that the host can adjust the USB bus clock frequency; thus the USB reference can be locked to the reference clock.

The endpoint controller also maintains status to indicate when it is locked to the USB 1 KHz bus clock and when a discontinuity occurs in the USB bus clock due to a missing or incorrect Start_Of_Frame packet. This is used by the software to adjust the queuing of isochronous packets. The current frame number is used by the endpoint controller to determine which isochronous buffer to transmit next.

Endpoint Pipe Controller

In a preferred embodiment, the endpoint pipe controller (EPC) provides the interface for USB function endpoints. In a preferred embodiment, up to 16 such endpoint pipes are supported at any given time, each with the same function address. The EPC maintains separate state information for each endpoint pipe.

State information required for immediate decisions (such as responding with a NAK or STALL handshake) is kept within the module at all times for each endpoint pipe. Other information necessary for endpoint operation is kept in an endpoint array in memory. In a preferred embodiment, only one endpoint pipe is active at any given time, allowing a single endpoint pipe state machine to be shared among all endpoint pipes.

For IN tokens, the EPC is responsible for transferring data from the defined buffer to the host. For OUT tokens, the EPC is responsible for transferring data from the host to the defined buffer. To allow more flexibility when assigning buffers to an endpoint pipe, in a preferred embodiment a double buffering scheme is permitted on each endpoint pipe. This allows the EPC to provide a prompt response to all transactions to this module without resorting to NAKs.

In a preferred embodiment, all information used by endpoint pipes during data transfers is maintained in the endpoint array, which is located in RAM. This array is indexed, by endpoint pipe, from the base defined in the endpoint array base address (EABA) register. This array contains two double-words per endpoint. Each double word is a control word that contains command and status information for the endpoint pipe, such as a pointer to the beginning of the buffer, the size of the buffer, the state of the buffer, and other relevant parameters.

The buffer state defines if the buffer is to be used for input or output transactions, and whether it is currently being accessed or has completed the desired operation.

When an IN or OUT transfer is requested of an endpoint pipe with a buffer present, the appropriate control word is read. This control word tells the endpoint controller how to complete the transaction. At the end of a transaction, the control word is written with status which is used by software as an indication to release this buffer and provide a new one.

Registers

In a preferred embodiment, two registers relevant to the invention of the present application are the endpoint command register and the USB data register.

In a preferred embodiment, the endpoint command register (ECR) is a word-wide, read/write register. The ECR is used to perform commands on a specified endpoint. Upon reset, this register is cleared. The ECR register format is shown below:

| Bits | Function Label |
|------|----------------|
| 15–8 | (Reserved) |
| 7–4 | Endpoint Pipe Number (EPN) |
| 3–0 | Endpoint Command (CMD) |

The endpoint pipe number EPN determines the endpoint pipe on which the command is performed. In a preferred embodiment, this register can be implemented in the high-speed bus interface logic. The data is passed across the asynchronous interface. Two signals are passed back from the endpoint controller; one to indicate that the command was processed and that the command value should be cleared to "0", and another indicating that the command could not be processed and should be set to "F".

The endpoint command CMD can take the following values:

0000: Complete. This value indicates that the previous command is complete and the endpoint controller is ready to accept another command.

0001: Input Enable (CMD.IENB). This value causes the specified endpoint pipe to enter the Input Idle state I_IDL from the Stall (Halt) or Disable state. The Control Word Pointer for the specified endpoint pipe is reset to 0. If the current state is not Disable or Stall, a "F" is returned to indicate that an illegal command was attempted on this endpoint and the command is ignored.

0010: Input Ready (CMD.IRDY). This value causes the specified endpoint pipe to enter the Input Ready state I_RDY if it is currently in the Input Idle state I_IDL. This command is issued after a control word with an Input Ready buffer state I_RDY is written into the endpoint array for the corresponding endpoint. This command does not cause the control word in memory to be read; instead, it permits it to be read in response to reception of an IN token. If the current state of the endpoint is not Input Idle I_IDL, the command is ignored. If the current state is one of the Output or Setup states or Disable or Stall, a "F" is returned to indicate that an illegal command was attempted on this endpoint.

0011: Input Isochronous Ready (CMD.ISRDY). This value causes the specified endpoint pipe to enter the Input Isochronous Ready state IS_RDY, if it is currently in the Input Idle state I_IDL. This command is issued after a control word with the Input Ready buffer state is written into the endpoint array for the corresponding endpoint. This command does not cause the control word in memory to be read; instead, it permits it to be read in response to reception of an IN token. It is expected that the type field of the control word (TI) is set to isochronous, but this is not checked. If the current state of the endpoint is not Input Idle I_IDL, the command is ignored. If the current state is one of the Output or Setup states or is Disable or Stall, a "F" is returned to indicate that an illegal command was attempted on this endpoint.

0100: Output Enable (CMD.OENB). This value causes the specified endpoint pipe to enter the Output Idle state O_IDL from the Stall or Disable state. The Control Word Pointer for the specified endpoint is reset to 0. If the current state is not Disable or Stall, a "F" is returned to indicate that an illegal command was attempted on this endpoint, and the command is ignored.

0101: Output Ready (CMD.ORDY). This value causes the specified endpoint pipe to enter the Output Ready state O_RDY if it is currently in the Output Idle state O_IDL. This command is issued after a control word with an Output Ready state is written into the Endpoint Array for the corresponding endpoint. This command does not cause the control word in memory to be read; instead, it permits it to be read in response to reception of an OUT token. If the current state of the endpoint is not Output Idle the command is ignored. If the current state is one of the Input states, Stall, or Disable, then a "F" is returned to indicate that an illegal command was attempted on this endpoint.

0110: Output Isochronous Enable (CMD.OSENB). This value causes the specified endpoint pipe to enter the Output Isochronous Idle state OS_IDL from the Stall or Disable state. The Control Word Pointer for the specified endpoint is reset to 0. If the current state is not Disable or Stall, a "F" is returned to indicate that an illegal command was attempted on this endpoint, and the command is ignored.

0111: Output Isochronous Ready (CMD.OSRDY). This value causes the specified endpoint pipe to enter the Output Isochronous Ready state OS_RDY, if it is currently in the Output Isochronous Idle state OS_IDL. This command is issued after a control word with an Output Ready state is written into the Endpoint Array for the corresponding endpoint. This command does not cause the control word in memory to be read; instead, it permits it to be read in response to reception of an OUT token. If the current state of the endpoint is not Output Isochronous Idle the command is ignored. If the current state is one of the Input states, Stall, or Disable, then a "F" is returned to indicate that an illegal command was attempted on this endpoint.

1000: Setup Ready (CMD.SRDY). This value causes the specified endpoint pipe to enter the Setup Ready state S_RDY. This command is issued after a control word with an Output Ready state is written into the Endpoint Array for the corresponding endpoint. This command does not cause the control word in memory to be read; instead, it permits it to be read in response to reception of a SETUP token. If the current state of the endpoint is not Stall or Disable, the command is ignored.

1001: Disable (CMD.DISAB). This value causes the specified endpoint pipe to enter the disabled state DISABLE. This occurs immediately from any state. If the endpoint pipe is currently active, status is written in the control indicating that the endpoint was disabled.

1010: Stall (CMD.HALT). This value causes the specified endpoint to enter the Stall state HALT from any state. This occurs immediately from any state. If the endpoint pipe is currently active, status is written in the control indicating that the endpoint was stalled.

1011–1101: Reserved. These values cause no action to be performed, and return 0.

1110: Toggle CWP. This value causes the Control Word Pointer to be toggled. This is used with control transfers with an odd number of packets sent or received during the data phase.

1111: Error. This value indicates that an illegal command was attempted on the current endpoint pipe for its current state, and that a new command may be accepted.

In a preferred embodiment, the USB Data Register (UDR) is a word-wide, read/write register. Read accesses are permitted in all locations. The data register is loaded with the data read for the register selected by a USB index register (UIR) at all times. Writes of this register are permitted only in the USB Hub Registers when the selector bits of the UIR (UIR.SEL) have a value of 2. A status bit is defined in bit 15 of UIR to indicate that a write operation has been successful. This is necessary only when the Hub Functionality is included.

The part of the UDR relevant to the invention of the present application is the 8-bit endpoint pipe state. This state is stored for each endpoint pipe that is returned for the currently indexed endpoint pipe. If an invalid endpoint pipe is indexed, 0 is returned. The ECR register format is shown below:

| Bits | Function Label |
| --- | --- |
| 7 | Control (CTL) |
| 6 | Control Word Pointer (CWP) |
| 5–4 | (Reserved) |
| 3–0 | Endpoint Pipe State (EPS) |

Control CTL: This is asserted if this endpoint pipe is capable of accepting control sequences involving the SETUP token. This bit is set after CMD.SRDY for this endpoint pipe is performed and remains set until the endpoint is Disabled.

Control Word Pointer CWP: When the control word bit is 0, control word 0 of this endpoint in the endpoint array is accessed next. When the control word bit is 1, control word 1 for this endpoint is accessed next. This is set to 0 whenever the endpoint is enabled.

The endpoint pipe state EPS can take the following values:

| Value | State |
| --- | --- |
| 0 | Disabled DIS |
| 1 | Input Idle I_IDL |
| 2 | Input Ready I_RDY |
| 3 | Input Active I_ACT |
| 4 | Stalled HALT |
| 5 | Input Missed ACK I_MAK |
| 6 | Input Isochronous Ready IS_RDY |
| 7 | Input Isochronous Active IS_ACT |
| 8 | Setup Ready S_RDY |
| 9 | Output Idle O_IDL |
| 10 | Output Ready O_RDY |
| 11 | Output Active O_ACT |
| 12 | Setup Active S_ACT |
| 13 | Output Isochronous Idle OS_IDL |
| 14 | Output Isochronous Ready OS_RDY |
| 15 | Output Isochronous Active OS_ACT |

In a preferred embodiment, only one endpoint pipe is active at any given time.

Control Word

In a preferred embodiment, the endpoint pipe array contains 32 control words, two for each endpoint pipe. The endpoint pipe array is located in memory in an address pointed by an endpoint array base address register EABAR. This address must be 128-byte aligned (i.e., the 7 LSBs of the address are 0). The endpoint pipe array is indexed by the 4-bit endpoint pipe number EPN, and the control word accessed is determined by the 1-bit endpoint pipe control word pointer CWP. Together the 25-bit EABAR, 4-bit EPN, and one bit CW generate a 32-bit address aligned to a double-word (32-bit) boundary, and are used to access the 32-bit control word.

The 32-bit control word contains all the information required to operate this endpoint pipe, when active. There are two such entries for each endpoint pipe. The control word to be accessed next is determined by the endpoint pipe control word pointer CWP value. Immediately after a IN, OUT or SETUP token is received to an endpoint pipe currently in a ready state, the control word of the selected endpoint pipe at the current control word pointer is read to determine how to respond to the token. At the end of a transfer, when completion status is written, the control word is updated with the current status, the CWP is incremented, and the other control word is read. When intermediate status is written, only the most significant byte of the control word is updated. The control word format is shown below:

| Bits  | Function Label              |
|-------|-----------------------------|
| 31–28 | Buffer State BS             |
| 27    | (Reserved)                  |
| 26–16 | Buffer Address BA           |
| 15    | Buffer Page BP              |
| 14    | Buffer Rounding BR          |
| 13    | Toggle Enable TE            |
| 12    | Type Isochronous TI         |
| 11    | Interrupt on Packet Complete IC |
| 10    | Interrupt on Packet Error IE |
| 9–0   | Byte Count BC               |

The 4-bit buffer state BS is the portion of the control word relevant to the invention of the present application. The buffer state is updated by software and the endpoint pipe controller (EPC) to synchronize the control of this buffer between them. EPC writes status indicating the use of the buffer. This field is set by node firmware to Output Ready, Input Ready, Setup Ready, Skip, Stall and Disable. All other values are set by the EPC. The EPC can also write the Stall and disable values in error conditions. The buffer can be reclaimed by node firmware when the buffer state is any of the Complete values; this includes the Input/Output Complete Status and the Error codes.

The buffer state BS can take the following values:

0: Skip. This value is used together with the Output Ready Command. Skip causes the next data packet received to be ignored and the control word pointer to be incremented. For control endpoints, this also causes the endpoint pipe state to switch from the input/ready state to the output/input Idle state. The setting of TE and TI determines which handshake is returned, and the next state of the endpoint pipe. A NAK is returned if neither TE or TI is set. If TI is set, and not TE, no handshake is returned. If TE is set, an ACK is returned and complete status is written when a packet with the proper PID is received.

1: Input Ready IRDY. This value indicates that the buffer has been written with data to transmit in response to an IN token.

2: Output Ready ORDY. This value indicates that the buffer has been allocated for writing.

3: Setup Ready SRDY. This value indicates that the buffer has been allocated for writing. This is used only on a Control Endpoint during the first transfer of control read and control write operations. Write only in control word 0.

4: Output Wait OWT. This value indicates that an error occurred while receiving OUT data from the host. This includes detection of a bit stuff error. A retry is expected as this is considered intermediate status, except in the case of an isochronous OUT endpoint where it is treated as completion status.

5: CRC Error CRCE. This value indicates that a bad CRC was detected at the end of an OUT transaction. A retry is expected as this is considered intermediate status, except in the case of an isochronous OUT endpoint where it is treated as completion status.

6: Buffer Error BUFE. This value indicates that during an OUT, data was received faster from USB than it could be written to memory. During an IN, data was not read from memory fast enough to keep up with the USB data rate. A retry is expected on this endpoint.

7: Input Wait IWT. This value indicates that the buffer is being held by the endpoint controller and is waiting to try, or retry, to transmit this buffer at the next opportunity. This occurs in the case of a missed acknowledge.

8: Input Complete ICMP. This value indicates successful completion of this input operation. The buffer may be released.

9: Output Complete OCMP. This value indicates that the buffer is full of data and no error was detected.

10: Token Error TKNE. This value indicates that a token of the wrong type for the current context of this control endpoint pipe was received. If this was an output buffer, then the endpoint is halted. If this was an input buffer, a NAK is sent and the state of the other control word is examined. This is considered a completion status.

11: Isochronous Synchronization Error SYNE. This value indicates that data was received into a buffer with TE=1 and TI=1 but CWP was not equal to the LSB of the FNR. This is considered a completion status.

12: Data Error DATE. For OUT data, when CW.BR is not set and the amount of data received from the host was less than expected, or the allocated buffer was not big enough to store the OUT data. For IN data, this is set if a buffering error occurred and CW.TE was not set or CW.TI was set. This is considered a completion status.

13: (Reserved).

14: Halt. Causes the current endpoint pipe to enter its HALT state, or indicates that the endpoint has entered the HALT state.

15: Disable. Causes the current endpoint pipe to enter its DISABLE state or indicates that the endpoint has entered the DISABLE state.

Endpoint Pipe States

In a preferred embodiment, an endpoint can have the following states. To maintain operation and control, each endpoint pipe maintains a state with well-defined conditions for transferring between the state that involve an implicit hardware/software synchronization. Endpoint pipe state transitions occur:

on explicit software commands to an endpoint through the endpoint command register ECR;

by reading the buffer status of the other buffer in the other control word for this endpoint at the end of a transfer; and as a result of events on USB such as receipt of IN, OUT and SETUP tokens and ACK handshakes.

Figure 4:
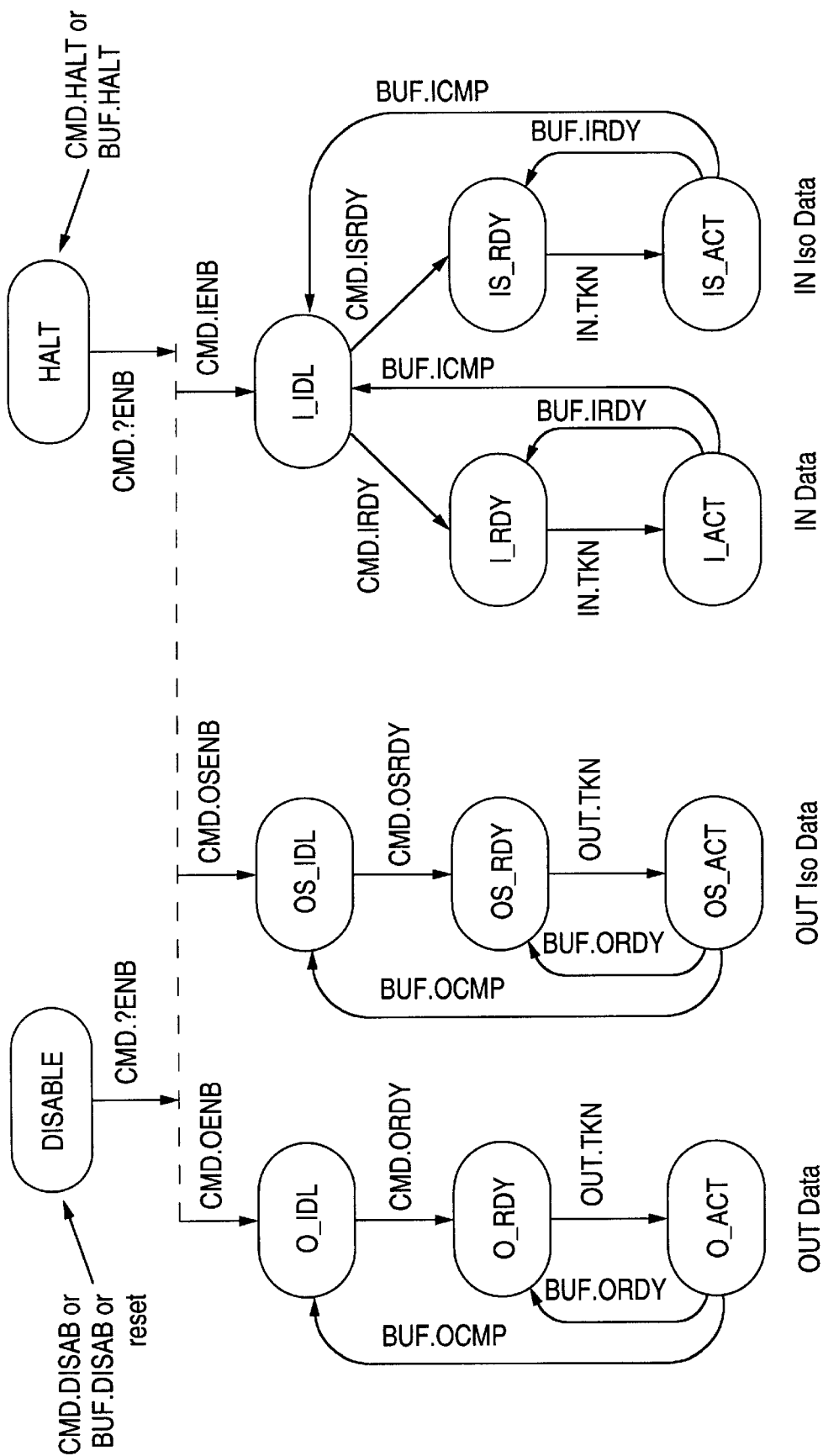
FIG. 4 is a state diagram corresponding to a preferred embodiment of the present invention.

FIG. 4 shows the simplified endpoint pipe state machine for handling of IN and OUT transactions. Handling of control read and control write transactions are handled in a similar manner.

The current endpoint pipe state is visible in the endpoint state register, which is accessible through the USB Index and Data registers. In a preferred embodiment, at most one endpoint pipe is ever in any of the Active states at any given time. This allows sharing of the Active state logic among all of the endpoint pipes.

An endpoint pipe can have the following states, as shown in FIG. 4:

Disable. The DISABLE state is entered upon reset, upon the disable command to this endpoint pipe, and upon detection of a disable state in the buffer state of a control word. Any token received to this endpoint pipe while in this state is returned with no handshake. Software intervention is required to remove the endpoint pipe from this state, typically through an enable command to one of the Idle states.

Halt. The HALT state is entered upon the stall command to this endpoint pipe, upon detection of a stall state in the buffer state of a control word, and upon certain error conditions. Any token received to this endpoint pipe while in this state is returned a STALL handshake to indicate that the endpoint is currently stalled. Software Intervention is required to remove the endpoint pipe from this state, typically through an enable command to one of the Idle states.

Input Idle I_IDL. In this state, the endpoint expects that a buffer will soon be allocated. A NAK handshake is returned in response to an IN token mapped to this endpoint pipe. No response is returned for OUT tokens from this endpoint pipe.

Input Ready I_RDY. This state is entered via an Input Ready command to this endpoint pipe or upon detection of another Input buffer at the end of a transfer. The command should only be given after a buffer has been allocated to this endpoint by writing the control word at the appropriate location in the endpoint array. This control word should point to a data buffer with data to return to the host in response to the next IN token received to this endpoint pipe. The PID value is transmitted as DATA0 when CWP is 0 and DATA1 when CWP is 1.

Input Active I_ACT. This state is entered upon receipt of an IN token when the selected endpoint state is currently Input Ready. While in this state, data is transferred from memory to the USB. Upon completion of the data transfer, an ACK handshake should be received within 16 big times. At the end of this time-out period, if an ACK was not received, the buffer wait status is written back to the control word. However, the address and byte counter are not overwritten because a retransmission will occur and the current values need to be used again. If an ACK is received, the buffer status along with the current value of the address and byte counter are written. Then the other control word on this endpoint is read to determine the next state of the endpoint to be used the next time a token is directed to this endpoint pipe. If this endpoint is being used for a control transfer a transfer to the output Ready or Output Idle state can occur to complete the status phase of a control read transfer.

Input Isochronous Ready IS_RDY. This state is entered via an Input Ready command to this endpoint pipe or upon detection of another Input buffer at the end of a transfer. The command should only be given after a buffer has been allocated to this endpoint by writing the Control Word at the appropriate location in the Endpoint Array. This control word should point to a data buffer with data to return to the host in response to the next IN token received to this endpoint pipe. The PID value is always transmitted as DATA0 independent of the value of CWP.

Input Isochronous Active IS_ACT. This state is entered upon receipt of an IN token when the selected endpoint state is currently Input Ready. While in this state data is transferred from memory to the USB. Upon completion of the data transfer, the buffer status along with the current value of the address and byte counter are written at the end of the transfer. Then the other control word on this endpoint is read to determine the next state of the endpoint to be used the next time a token is directed to this endpoint pipe.

Output Idle O_IDL. In this state, the endpoint expects that a buffer will soon be allocated. A NAK handshake is returned in response to an OUT token mapped to this endpoint pipe. No response is returned for IN tokens on this endpoint pipe.

Output Ready O_RDY. This state is entered after this endpoint pipe has been given a buffer in which to write data. This can be entered via in Output Ready command from the O_IDL state after the appropriate word in the endpoint array is written, or upon detection of another Output buffer at the end of a transfer.

Output Active O_ACT. This state is entered upon receipt of an OUT token. While in this state data from the USB is written to memory. At the end of an output transfer, status is written to the control word at CWP. If the transfer was not successful, i.e., a CRC or bit stuffing error was detected, this is written as the buffer status. If the transfer was successful, the output complete buffer status is written, CWP is inverted, and the other control word for this endpoint pipe is read. The appropriate transition is made based on the buffer state. If this endpoint is being used for a control transfer, a transfer to the Input Ready or Input Idle state can occur to complete the status phase of a control write transfer.

Output Isochronous Idle OS_IDL. In this state, the endpoint expects that a buffer will soon be allocated. No handshake is returned in response to an OUT token mapped to this endpoint pipe. No data or handshake is returned for IN tokens on this endpoint pipe.

Output Isochronous Ready OS_RDY. This state is entered after this endpoint pipe has been given a buffer in which to write data. This can be entered via an OSRDY command from the OS_IDL state after the appropriate word in the endpoint array is written, or upon detection of another Output buffer at the end of a transfer.

Output Isochronous Active OS_ACT. This state is entered upon receipt of an OUT token from the OS_RDY state. While in this state, data from the USB is written to memory. At the end of an output transfer, status is written to the control word at CWP. If the transfer was not successful, i.e., a CRC or bit stuffing error was detected, this is written as the buffer status. If the transfer was successful, the output complete buffer status is written. At the end of the status transfer, CWP is inverted, and the other control word for this endpoint pipe is read. The appropriate transition is made based on the buffer state.

Setup Ready S_RDY. This state is entered after this endpoint pipe has been given a buffer in which to write data. This state is entered by a setup ready command after the appropriate word in the endpoint array is written, or upon detection of the setup ready buffer state.

Setup Active S_ACT. This state is entered upon receipt of a SETUP token from the Setup Ready state. While in this state, data from the USB is written to memory. At the end of an output transfer, status is written to the control word at CWP, the CWP is inverted, and the other control word for this endpoint pipe is read. The appropriate transition is made based on the buffer state to the output idle, output ready, input idle, or input ready state depending on the type of control transfer and the buffer state read.

After reset, all of the endpoints are disabled. An endpoint is enabled by giving an enable command to an endpoint. This should only be done when input and/or output buffers will soon be allocated to this endpoint. All endpoints not currently mapped to an endpoint pipe are considered disabled.

Software allocates buffers to endpoints pipes on an as needed basis. After each buffer is allocated, it performs the input or output ready command on the endpoint pipe. If the endpoint pipe is currently in the Idle state, it enters the appropriate ready state. If the endpoint pipe is currently in a ready or active state, it ignores all commands except disable and stall commands to the endpoint pipe, which it handles immediately. Software must do this write in order to avoid potential synchronization problems since the UNIM endpoint pipe handling is asynchronous to the software operations.

Since up to two buffers can be allocated to each endpoint, the next buffer can be prepared while the current one is being processed to speed the data transfer and avoid unnecessary NAK handshakes.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. An apparatus for controlling a versatile universal serial bus (USB) endpoint pipe having an endpoint pipe state and an endpoint pipe type, comprising:
    a first data storage element which stores a state value indicating said endpoint pipe state;
    a second data storage element which stores an endpoint command; and
    control circuitry which changes said state value from a wait value indicating a wait state to an idle value indicating an idle state when said endpoint command is an enable command, wherein said endpoint pipe type is undetermined when said state value indicates said wait state, and wherein said enable command determines said endpoint pipe type.

2. The apparatus of claim 1, wherein said wait state is one of a disable state and a halt state.

3. The apparatus of claim 1, wherein said endpoint pipe type is determined to be one of an isochronous output pipe, a non-isochronous output pipe, and an input pipe.

4. The apparatus of claim 1, wherein said enable command is one of an output enable command, an isochronous output enable command, and an input enable command.

5. The apparatus of claim 1, wherein said control circuitry further changes said state value from said idle value to a ready value indicating a ready state when said endpoint command is a ready command, wherein said ready command further determines said endpoint pipe type.

6. The apparatus of claim 5, wherein said endpoint pipe type is determined to be one of an isochronous output pipe, a non-isochronous output pipe, an isochronous input pipe, and a non-isochronous input pipe.

7. The apparatus of claim 1, wherein said first data storage element is a register.

8. The apparatus of claim 1, wherein said second data storage element is a register.

9. An apparatus for controlling a universal serial bus (USB) endpoint pipe having an endpoint pipe state, comprising:
    a first data storage element which stores a state value indicating said endpoint pipe state;
    a second data storage element which stores a buffer command, wherein said buffer command is generated by software in accordance with a buffer status; and
    control circuitry which changes said state value from an active value indicating an active state to a different value indicating a different state in response to said buffer command.

10. The apparatus of claim 9, wherein said different state is one of an idle state when said buffer command is a buffer completed command, and a ready state when said buffer command is a buffer ready command.

11. The apparatus of claim 9, wherein said first data storage element is a register.

12. An apparatus for controlling a versatile universal serial bus (USB) endpoint pipe having an endpoint pipe state and an endpoint pipe type, comprising:
    a first data storage element which stores a state value indicating said endpoint pipe state;
    a second data storage element which stores an endpoint command;
    a third data storage element which stores a buffer command; and
    control circuitry which changes said state value from a wait value indicating a wait state to an idle value indicating an idle state when said endpoint command is an enable command, and which changes said state value from an active value indicating an active state to a different value indicating a different state in response to said buffer command, wherein said endpoint pipe type is undetermined when said state value indicates said wait state, and wherein said enable command determines said endpoint pipe type.

13. The apparatus of claim 12, wherein said control circuitry further changes said state value from said idle value to a ready value indicating a ready state when said endpoint command is a ready command, wherein said ready command further determines said endpoint pipe type.

14. The apparatus of claim 12, wherein said first data storage element is a register.

15. The apparatus of claim 12, wherein said second data storage element is a register.

16. An apparatus for controlling a versatile universal serial bus (USB) endpoint pipe having an endpoint pipe state and an endpoint pipe type, comprising:
    a first register which stores a state value indicating said endpoint pipe state;
    a second register which stores an endpoint command;
    a data storage element which stores a buffer command; and
    control circuitry which changes said state value from a wait value being one of a halt value indicating a halt state and a disable value indicating a disable state, to an idle value being an input idle value indicating an input idle state when said endpoint command is an input enable command, an isochronous output idle value indicating an isochronous output idle state when said endpoint command is an isochronous output enable command, and a non-isochronous output idle value indicating a non-isochronous idle state when said endpoint command is a non-isochronous output enable command,
    wherein said control circuitry changes said state value from said input idle value to an isochronous input ready value indicating an isochronous input ready state when said endpoint command is an isochronous input ready command, from said input idle value to a non-isochronous input ready value indicating a non-isochronous input ready state when said endpoint command is a non-isochronous input ready command, from said isochronous output idle value to an isochronous output ready value indicting an isochronous output ready state when said endpoint command is an isochronous output ready command, and from said non-isochronous output idle value to a non-isochronous output ready value indicating a non-isochronous output ready state when said endpoint command is a non-isochronous output ready command, wherein said control circuitry changes said state value from an isochronous input active value indicating an isochronous input active state to said input idle state when said buffer command is an input buffer complete command, from said isochronous input active value to said isochronous ready value when said buffer command is an input buffer ready command, from a non-isochronous input active value indicating a non-isochronous input active state to said input idle value when said buffer command is said input buffer complete command, from said non-isochronous input active value to said non-isochronous input ready value when said buffer command is said input buffer ready command, from an isochronous output active value indicating an isochronous output active state to said isochronous output idle value when said buffer command is an output buffer complete command, from said isochronous output active value to said isochronous output ready value when said buffer command is an output buffer ready command, from a non-isochronous output active value indicating a non-isochronous output active state to said non-isochronous output idle state when said buffer command is said output buffer complete command, and from said non-isochronous output active value to said non-isochronous output ready value when said buffer command is said output buffer ready command, wherein said endpoint pipe type is undetermined when said state value is said wait value, and wherein said endpoint pipe type is an input pipe when said endpoint command is said input enable command, an isochronous output pipe when said endpoint command is said isochronous output enable command, a non-isochronous output pipe when said endpoint command is said non-isochronous output enable command, an isochronous input pipe when said endpoint command is said isochronous input ready command, and a non-isochronous input pipe when said endpoint command is said non-isochronous input ready command.

17. A method of controlling a versatile universal serial bus (USB) endpoint pipe having an endpoint pipe state and an endpoint pipe type, comprising the steps of:

maintaining the endpoint pipe state in a wait state, wherein said endpoint type is undetermined; and changing said endpoint pipe state from said wait state to an idle state in response to an enable command, wherein said enable command determines said endpoint pipe type.

18. The method of claim 17, wherein said wait state is one of a disable state and a halt state.

19. The method of claim 17, wherein said endpoint pipe type is determined to be one of an isochronous output pipe, a non-isochronous output pipe, and an input pipe.

20. The method of claim 17, wherein said enable command is one of an output enable command, an isochronous output enable command, and an input enable command.

21. The method of claim 17, further comprising the step of:

changing said endpoint pipe state from said idle state to a ready state in response to a ready command, wherein said ready command further determines said endpoint pipe type.

22. The method of claim 21, wherein said endpoint pipe type is determined to be one of an isochronous output pipe, a non-isochronous output pipe, an isochronous input pipe, and a non-isochronous input pipe.

23. The method of claim 21, wherein said ready command is obtained from a register.

24. The method of claim 17, wherein said enable command is obtained from a register.

25. A method of controlling a universal serial bus (USB) endpoint pipe having an endpoint pipe state, comprising the steps of:

generating a buffer command by software in accordance with a buffer status, reading said buffer command from a data storage element when said endpoint state is an active state; and changing said endpoint pipe state from said active state to a different state in response to said buffer command.

26. The method of claim 25, wherein said different state is one of an idle state when said buffer command is a buffer completed command, and a ready state when said buffer command is a buffer ready command.

27. A method of controlling a versatile universal serial bus (USB) endpoint pipe having an endpoint pipe state and an endpoint pipe type, comprising the steps of:

maintaining the endpoint pipe state in a wait state, wherein said endpoint type is undetermined;

changing said endpoint pipe state from said wait state to an idle state in response to an enable command, wherein said enable command determines said endpoint pipe type; and changing said endpoint pipe state from an active state to a different state in response to a buffer command, wherein said buffer command is obtained from a data storage element.

28. The method of claim 27, further comprising the step of:

changing said endpoint pipe state from said idle state to a ready state in response to a ready command, wherein said ready command further determines said endpoint pipe type.

29. An apparatus for controlling a universal serial bus (USB) endpoint pipe having an endpoint pipe state and an endpoint pipe type, comprising:

a first data storage element which stores a state value indicating one of a plurality of endpoint pipe states;

a second data storage element which stores an endpoint command; and control circuitry which changes said state value from an initial value indicating an initial state to a different value indicating a different state in response to said endpoint command, wherein said endpoint pipe type is undetermined when said state value indicates said initial state, and wherein said endpoint command determines said endpoint pipe type.

30. The apparatus of claim 29, wherein said endpoint pipe type is determined to be one of an isochronous output pipe, a non-isochronous output pipe, and an input pipe.

31. The apparatus of claim 29, further comprising:

a third data storage element which stores a buffer command;

wherein said control circuitry is further configured to change said state value from an active value indicating an active state to another value indicating another state in response to said buffer command.

32. The apparatus of claim 31, wherein said different state is said another state.

33. A method of controlling a universal serial bus (USB) endpoint pipe having an endpoint pipe state and an endpoint pipe type, comprising the steps of:

maintaining the endpoint pipe in an initial state being one of a plurality of endpoint pipe states, wherein said endpoint type is undetermined; and changing said endpoint pipe state from said initial state to a different state in response to an enable command, wherein said enable command determines said endpoint pipe type.

34. The method of claim 33, wherein said endpoint pipe type is determined to be one of an isochronous output pipe, a non-isochronous output pipe, and an input pipe.

35. The method of claim 33, further comprising the step of:

changing said state value from an active value indicating an active state to another value indicating another state in response to a buffer command.

36. The method of claim 34, wherein said different state is said another state.

* * * * *